May 7, 1957     S. R. GROTTA     2,791,468
FUEL SUPPLY CONTROL
Filed June 11, 1953

INVENTOR
STEPHEN R. GROTTA

BY

ATTORNEYS

United States Patent Office 2,791,468
Patented May 7, 1957

2,791,468

FUEL SUPPLY CONTROL

Stephen R. Grotta, Manchester, Conn., assignor, by mesne assignments, to the United States of America as represented by the Secretary of the Navy Application June 11, 1953, Serial No. 360,912

3 Claims. (Cl. 299—114)

This invention relates to internal combustion engines, and particularly to the control of the flow of liquid fuel to the combustion chamber, or chambers, of an aircraft power plant of either the turbine type, pure jet type, or reciprocating piston type.

Liquid fuel is supplied to the combustion space of such a power plant by way of one or more discharge nozzles which inject the fuel into the burner compartments, where it is atomized and commingled with the air stream supplied by way of the compressor portion of the power plant. The type of fuel discharge nozzle commonly employed involves provision of radially extending, curvilinear passageways converging toward an injection orifice, thus establishing a vortex effect to impart a swirling action, or turbulence, to the incoming fuel just before it passes through the nozzle orifice. In this fashion there is assured a more effective distribution of the fuel to all parts of the burner chambers of the power plant. However, such swirl passages do not work at greatest efficiency unless the rate of fuel supply is sufficient to maintain the swirl passages completely filled with fuel at all times. This in turn creates a problem of oversupply, because when the craft is flying at high altitudes the quantity of fuel required decreases sharply from the maximum supply capacity of the nozzle. This problem has led to the use of surplus return passages by means of which the oversupply is delivered back to the fuel source, for recirculation in the fuel supply system. The resort to such a method of handling the problem has several objections, a primary objection being the added complexity and cost of the mechanical parts required to accomplish and to regulate such excess fuel return.

The present invention presents a different solution to this problem, which different solution involves constructing the fuel discharge nozzle in such fashion that the swirl passages of the nozzle are maintained filled even at low fuel demand periods, yet the actual delivery rate is made variable in accordance with the load requirements, so that there is no overflow, or excess, to be returned to the fuel source.

An object of the invention, therefore, is to provide a fuel discharge nozzle of novel construction, and having means inherent in its structure to maintain a full turbulence effect under conditions of either maximum or minimum fuel demand.

A second object is to provide a fuel supply control system including atmospheric pressure responsive means for regulating the action of a fuel discharge nozzle, to control the rate of fuel delivery in accordance with demand; the demand varying as altitude varies.

A third object is to provide, in a control system of the character indicated, a novel interrelationship between a plurality of expansible control units, one of which cooperates directly with and in fact forms part of the fuel nozzle, to regulate fuel flow in response to the degree of expansion or construction of the others.

Another object of the invention is to provide a fuel discharge nozzle including, as integral features thereof, a fuel entry passage, and means for varying the discharge rate in accordance with variations in the pressure exerted by the fuel traversing said entry passage; the said fuel entry pressure being a function of the time lag between throttle setting on the one hand and engine speed and/or load, on the other; the word "engine" being used as embracing any type of internal combustion power plant.

A further object of the invention is to provide a fuel discharge nozzle for aircraft propulsion systems, incorporating an orifice area control element adapted to respond to a combination of forces exerted thereon, one of said forces being a reflection of the altitude at which the aircraft is operating, and another of said forces being a reflection of the speed and/or load at which the propulsion system is operating.

Other objects and many of the attendant advantages of this invention will be readily appreciated as the same becomes better understood by reference to the following detailed description when considered in connection with the accompanying drawings wherein:

Fig. 2 being a view along the line 2—2 of Fig. 1.

Figure 1:
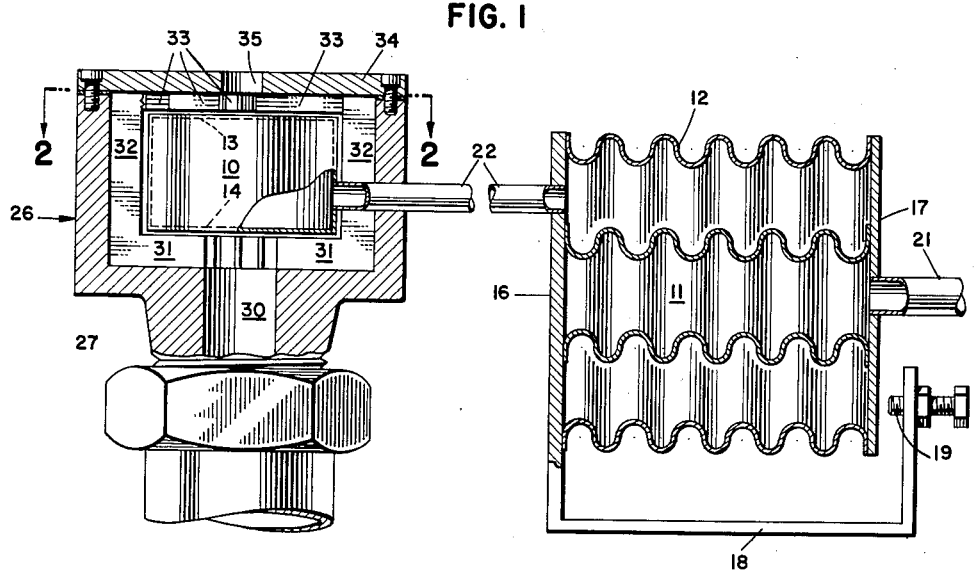
Fig. 1 is a schematic view of a control system embodying the invention.
Figure 2:
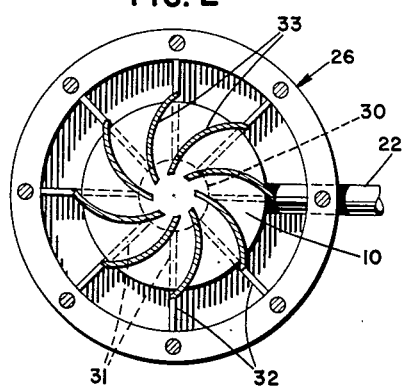
Figs. 2 and 3 are, respectively, plan and sectional views of the fuel supply nozzle, a component of the complete system shown in Fig. 1.

As illustrated the invention includes three expansible elements 10, 11 and 12; the element 10 being a cylindrical capsule serving as a valve, and having thin, flexible, resilient upper and lower walls 13 and 14 of copper or similar metal or metal alloy, and the elements 11 and 12 being concentrically disposed bellows assemblies with end walls 16 and 17, common thereto. The wall 16 is part of a stationary fixture 18 in which is adjustably mounted a screw 19 serving to limit the extent of lateral shift of the movable wall 17 common to the two bellows units. The inner bellows unit 11 is vented to the atmosphere, as indicated at 21, and a conduit 22 establishes communication between bellows unit 12 and the interior of capsule 10.

Figure 3:
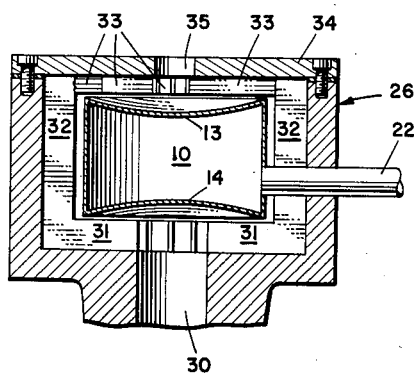

The nozzle 26 has a threaded shank 27 for attachment to the end of a fuel supply line; the shank being centrally apertured to admit the fuel to the main chamber of the nozzle, in which main chamber the capsule 10 is centrally disposed, being confined and positioned by the horizontal and vertical ridges 31 and 32, with the lower wall 14 of the capsule resting upon the horizontal ridge 31. Curving and radially converging ridges 33 (see Fig. 3) are formed on the upper wall 34 of the nozzle, which upper wall is centrally apertured, as at 35, for discharge of the fuel delivered to orifice 35 by way of the supply passage 30 and the connecting passages found by the ridges 31, 32 and 33, the latter imparting a swirling, turbulent action to the fuel as it approaches the orifice 25.

At relatively high altitudes the upper and lower walls of capsule 10 will be substantially flat, as illustrated in Fig. 1. In this condition the fuel flow to orifice 35 will be at a relatively low rate, and yet there will be sufficient fuel in the nozzle to maintain the vortex passages between ridges 33 filled with liquid fuel at all times, thus assuring maintenance of the desired turbulence effect.

As the craft's altitude decreases, bellows 11 expands (due to increased atmospheric pressure), causing bellows 12 to expand correspondingly. This expansion decreases the pressure within unit 12, and this pressure drop is reflected within capsule 10 as well, where it causes the end walls of the capsule to bow inwardly, toward the position indicated in Fig. 3 as the pressure in the bellows 11 increases to cause the bellows 12 to expand and move the end wall 17 outwardly to contact the screw 19 as the outer limit of travel; the cylindrical wall also being flexed inwardly. Fuel delivery through orifice 35 increases accordingly.

In addition to the atmospheric pressure variations acting (indirectly) upon the capsule 10 to expand or contract its walls, there is a second force which acts directly upon the capsule. This second force is the pressure of the fuel itself as it traverses entry passage 30 of the nozzle assembly. When the fuel is being delivered through orifice 35 at a rate approximately equal to the rate of admission of fuel into the entry passage (as when the throttle setting and the engine speed are in harmony, or whenever the fuel delivery rate is substantially correct for the prevailing speed and load) there will be relatively little pressure exerted by the flowing fuel upon the walls of capsule 10. On the other hand, when the engine speed is lagging behind the speed called for by the throttle setting, or whenever engine load is greater than can be absorbed by the quantity of fuel passing through the orifice 35, there will be an increase in the pressure of the incoming fuel against the walls of capsule 10, and these walls will contract, thus enlarging the space around capsule 10 and permitting a larger quantity of fuel to pass to the orifice 35, for delivery to the power plant.

The two forces above-described, namely (a) the indirect force exerted through bellows 11 and 12, and (b) the direct force exerted by the fuel itself, as it applies pressure to the capsule in its passage around it are operative concurrently, and the reaction of capsule 10 is therefore in accordance with the resultant of these two forces, as they exist at any moment. One is the complement of the other, and together they tend to combine all factors which influence the performance of the power plant.

It will be appreciated that the pressure exerted upon capsule 10 through bellows 11 and 12 will depend upon the relative diameters of these bellows units. Accordingly, any desired force differential can be obtained by choosing a diameter ratio that will provide either a force multiplication or force reduction, as desired. By the same token the vents 21 and 22 may be inter-changed, as another means of varying the effective force ratio.

Obviously many modifications and variations of the present invention are possible in the light of the above teachings. It is therefore to be understood that within the scope of the appended claims the invention may be practiced otherwise than as specifically described.

What is claimed is:

1. A fuel supply system for aircraft propulsion systems comprising means defining a chamber having a fuel inlet orifice and a fuel delivery orifice, a flexible-walled capsule conforming in shape with the chamber inner surface and positioned within said chamber between said inlet and delivery orifices, a plurality of radially disposed ribs formed on the inner surface of the chamber, said capsule being supported and spaced apart from the chamber inner surface by said ribs such that a plurality of fuel passages are defined by the outer surface of the capsule, the ribs, and the inner surface of the chamber so as to communicate the inlet orifice with the delivery orifice, said capsule being adapted to respond in volume to a combination of forces thereon, one of said forces being a reflection of the altitude at which the aircraft is operating, and another of said forces being a reflection of the speed and load at which the propulsion system is operating, a first bellows, and a second bellows coaxially and concentrically disposed around said first bellows, said first and said second bellows having common end walls, the interior of the first bellows being in direct communication with the atmosphere and the second bellows being in closed direct communication with said capsule such that the walls of the capsule are forced to expand when the altitude at which the aircraft is operating is increased and vice versa.

2. A fuel supply system for aircraft propulsion systems comprising means defining a chamber having a fuel inlet orifice and a fuel delivery orifice and formed with a plurality of swirl passages for creating fuel turbulence between the fuel orifices of the chamber, a flexible-walled capsule conforming in shape with the chamber inner surface and positioned within said chamber between said fuel orifices and adapted to vary the amount of fuel flow through the chamber, the walls of said capsule when in an expanded state contacting the passages to restrict fuel flow solely to the fuel flowing in said passages for minimum fuel delivery through said fuel delivery orifice, the walls of said capsule when in a contracted state permitting fuel to flow between the capsule wall and the passages for maximum fuel delivery through said fuel delivery orifice, a first bellows, a second bellows, said first bellows being coaxially disposed within the second bellows, said first and second bellows having common end walls, the interior of said first bellows being in direct communication with the atmosphere, and the second bellows being in closed direct communication with said capsule such that an increase in atmospheric pressure indirectly forces the walls of said capsule in a contracted state and a decrease in atmospheric pressure indirectly forces the walls of said capsule in an expanded state, said capsule walls being varied in shape directly by the force of fuel flowing through said chamber, the combination of the indirect force on the walls of the capsule caused by atmospheric pressure and the direct force on the walls of the capsule caused by fuel flowing through said chamber operating concurrently on said capsule such that the resultant of said direct and indirect forces vary the volume of the capsule to control the flow of fuel through the chamber.

3. A fuel flow control system comprising; a housing having a cylindrical sidewall and a top and a bottom, the top being provided with a discharge orifice and the bottom having an inlet orifice, horizontally-disposed radially-spaced ridge members fixed to the inner surface of said bottom and laterally extending from the inlet orifice to the cylindrical sidewall, vertically-disposed radially-spaced ridge members connected to the inner surface of the cylindrical sidewall, each vertical ridge member forming a continuation of each horizontal ridge member, curvilinear radially-spaced ridge members attached to the inner surface of the top and formed to converge at the discharge orifice, each top ridge member forming a continuation of the vertical ridge members, said bottom ridge members and vertical ridge members and top ridge members defining a central area within the housing, a flexible-walled capsule located within said area of the housing and supported by the bottom-fixed ridges, the innermost edges of each of the ridges being disposed so as to contact the surface of said capsule when the capsule is caused to expand to its maximum volume, and means communicating with said capsule to vary the volume of said capsule in response to changes in atmospheric pressure in order to vary the volume of fluid flow through said housing.

References Cited in the file of this patent

UNITED STATES PATENTS

| 773,688 | Still | Nov. 1, 1904 |
| 1,457,701 | Hesselman | June 5, 1923 |
| 1,638,958 | Preston | Aug. 16, 1927 |
| 1,841,211 | Ryden | Jan. 12, 1932 |
| 2,244,555 | Harris | June 3, 1941 |
| 2,653,767 | Gillham | Sept. 29, 1953 |

FOREIGN PATENTS

| 677,519 | Great Britain | Aug. 30, 1952 |